(12) United States Patent  
Dong

(10) Patent No.: US 8,353,540 B2
(45) Date of Patent: Jan. 15, 2013

(54) BATTERY COVER LATCHING MECHANISM FOR PORTABLE ELECTRONIC DEVICE

(75) Inventor: Shui-Jin Dong, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 344 days.

(21) Appl. No.: 12/840,440

(22) Filed: Jul. 21, 2010

(65) Prior Publication Data

US 2011/0215594 A1  Sep. 8, 2011

(30) Foreign Application Priority Data

Mar. 5, 2010  (CN) .......................... 2010 1 0118621

(51) Int. Cl.
   *E05C 19/10* (2006.01)
   *E05C 19/00* (2006.01)
   *E05C 19/12* (2006.01)
   *E05C 3/02* (2006.01)
   *E05B 15/02* (2006.01)

(52) U.S. Cl. ............... 292/24; 292/1; 292/11; 292/240; 292/340; 292/DIG. 11; 292/DIG. 63

(58) Field of Classification Search ............... 292/1, 11, 292/24, 25, 27, 28, 31, 240, 300, 340, 56, 292/57, DIG. 11, 44, 45, 49, 80, 81, 83, 91, 292/95, 96, 98, 194, 195, 197, DIG. 63, DIG. 38, 292/116, 117, 119; 361/679.58, 679.57

See application file for complete search history.

(56) References Cited

U.S. PATENT DOCUMENTS

| 1,272,590 | A | * | 7/1918 | Wightman | 70/98 |
| 4,500,120 | A | * | 2/1985 | Ridgewell et al. | 292/19 |
| 4,836,707 | A | * | 6/1989 | Myers | 403/322.4 |
| 4,912,950 | A | * | 4/1990 | Crowle | 70/58 |
| 4,958,864 | A | * | 9/1990 | Fischer et al. | 292/19 |
| 6,325,427 | B1 | * | 12/2001 | Daoud | 292/27 |
| 7,773,376 | B2 | * | 8/2010 | Wang | 361/679.58 |
| 7,780,203 | B2 | * | 8/2010 | Jan et al. | 292/27 |
| 7,815,227 | B2 | * | 10/2010 | Jan et al. | 292/27 |
| 7,826,218 | B2 | * | 11/2010 | Wang | 361/679.55 |
| 7,969,731 | B2 | * | 6/2011 | Yang et al. | 361/679.55 |
| 8,085,532 | B2 | * | 12/2011 | Tseng | 361/679.58 |
| 2007/0217140 | A1 | * | 9/2007 | Chen et al. | 361/683 |

* cited by examiner

*Primary Examiner* — Thomas Beach
*Assistant Examiner* — Nathan Cumar
(74) *Attorney, Agent, or Firm* — Altis Law Group, Inc.

(57) ABSTRACT

A battery cover latching mechanism comprises a housing, a cover and a latch. The housing has at least one hook protruding therefrom. The cover has at least one latching hole defined therethrough and releasably latching with the hook. The latch is rotatably mounted to the cover and resisting the hook. When the latch is rotated relative to the cover, the latch pushes the hook to release the latching engagement of the hook and the latching hole.

14 Claims, 5 Drawing Sheets

BATTERY COVER LATCHING MECHANISM FOR PORTABLE ELECTRONIC DEVICE

BACKGROUND

1. Technical Field

The disclosure generally relates to battery cover latching mechanisms, and particularly relates to battery cover latching mechanisms used in portable electronic devices.

2. Description of Related Art

Batteries are widely used in portable electronic devices, such as personal digital assistants (PDAs), cellular phones, etc. A typical latching structure is used to latch a battery cover to the electronic device and thus to secure the battery between the battery cover and the electronic device. However, a typical latching structure may be hard to unlatch for exposing the battery to remove the battery.

Therefore, there is a room for improvement within the art.

BRIEF DESCRIPTION OF THE DRAWINGS

Many aspects of the exemplary battery cover latching structure for portable electronic device can be better understood with reference to the following drawings. These drawings are not necessarily drawn to scale, the emphasis instead being placed upon clearly illustrating the principles of the exemplary battery cover latching structure and portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
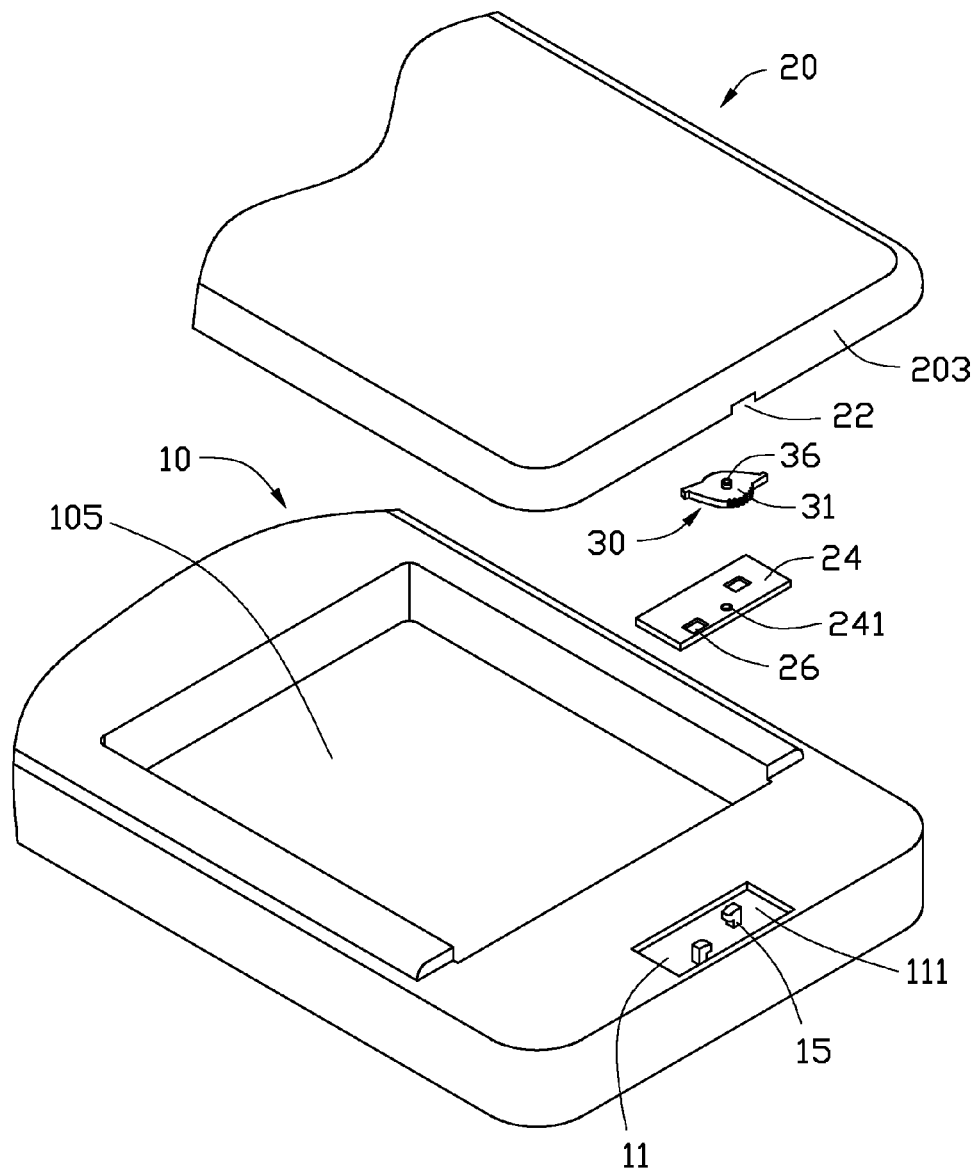
FIG. 1 is a schematic and exploded view of a portable electronic device with a battery cover latching mechanism according to an exemplary embodiment.

An exemplary embodiment of an electronic device (not labeled) incorporating a battery cover latching mechanism is shown in FIG. 1. The battery cover latching mechanism includes a housing 10, a cover 20 secured to the housing 10 and a latch 30. The latch 30 is rotatably mounted to the cover 20 for releasing the securing engagement between the housing 10 and the cover 20.

The housing 10 defines a compartment 105 for accommodating a battery (not shown) and a recess 11 located near one end thereof. The housing 10 further includes two spaced hooks 15 protruding from a bottom wall 111 of the recess 11. The hooks 15 face each other for latching the housing 10 to the cover 20.

Figure 2:
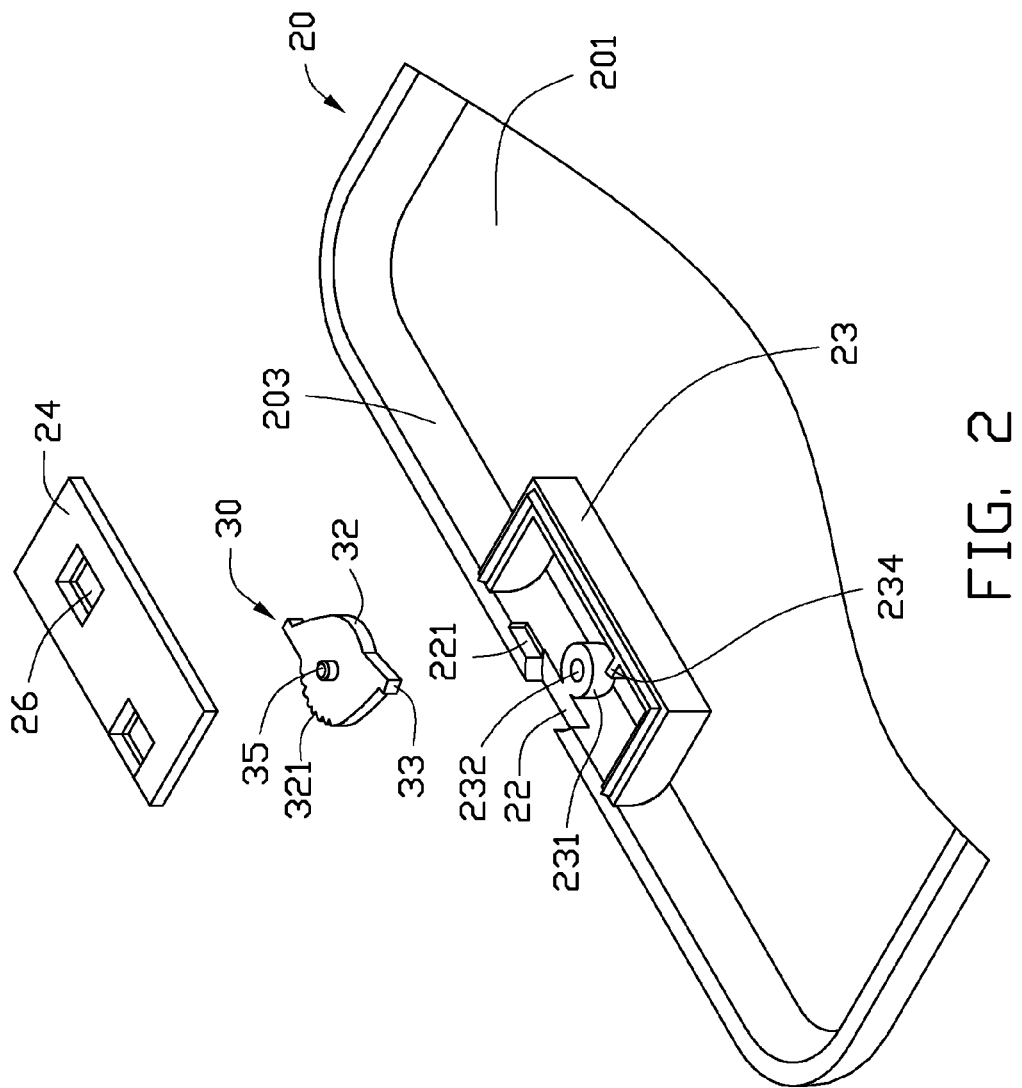
FIG. 2 is a partially enlarged view of the portable electronic device shown in FIG. 1, but a housing is removed.

Also referring to FIG. 2, the cover 20 includes a main body 201 and a sidewall 203 connecting to the main body 201. The cover 20 further includes an opening 22 defined through the sidewall 203, a mounting frame 23 protruding from the main body 201 and connecting to the sidewall 203 and a latching board 24 retained on the mounting frame 23. The opening 22 is for exposing the latch 30 out of the cover 20. The latching board 24 defines two latching holes 26 respectively correspondingly to the hooks 15. Each hook 15 latches in one of the latching holes 26 so the cover 20 secures to the housing 10 like shown in FIG. 3. The cover 20 further includes a joint 231 positioned on the main body 201 and in the mounting frame 23. The joint 231 is for rotatably mounting the latch 30 to the cover 20. In this exemplary embodiment, the joint 231 defines a slot 232 and the latch 30 has a shaft 36 which is sized and shaped to the slot 232, the shaft 36 rotatably locates in the slot 232 so the latch 30 can rotate about the shaft 36 relative to the cover 20.

The latch 30 is a plate including two opposite cam surfaces 32 formed thereon and two opposite blocks 33 protruding therefrom. When the latch 30 is mounted to the cover 20, the latch 30 locates between the latching holes 26, and each cam surface 32 faces one of the latching holes 26. The blocks 33 resist the cover 20 to hold the latch 30 on the cover 20. In this exemplary embodiment, the cover 20 defines a resisting groove 221 at the sidewall 203 for receiving one of the blocks 33 and protrudes a protrusion 234 from the mounting frame 23 for resisting the other of the blocks 33, so the latch 30 is held between the resisting groove 221 and the protrusion 234. The latch 30 further includes a plurality of raised portions 321 protruding between one of the blocks 33 and one of the cam surfaces 32. The raised portions 321 extend out of the opening 22 for facilitating actuating the latch 30.

The battery cover latching mechanism further includes a post 35 protruding from the latch 30 opposite to the shaft 36 and an orifice 241 defined in the latching board 24. The post 35 is rotatably accommodated in the orifice 241 to assist the latch 30 to rotate relative to the cover 20.

Referring to FIGS. 1-3 and 5, in assembly, the shaft 36 is accommodated in the slot 232 to rotatably mount the latch 30 to the cover 20, one of the blocks 33 is received in the resisting groove 221 and the other of blocks 33 resists the protrusion 234 so the latch 30 is firmly positioned in the mounting frame 23. The latching board 24 is mounted on the mounting frame 23, and the post 35 is rotatably accommodated in the orifice 241. The hooks 15 are aligned with the latching holes 26. The cover 20 is pushed toward the housing 10 until the hooks 15 latch with the latching board 24 so the cover 20 is secured to the housing 10. At this stage, each hook 15 resists one of the cam surfaces 32.

Figure 3:
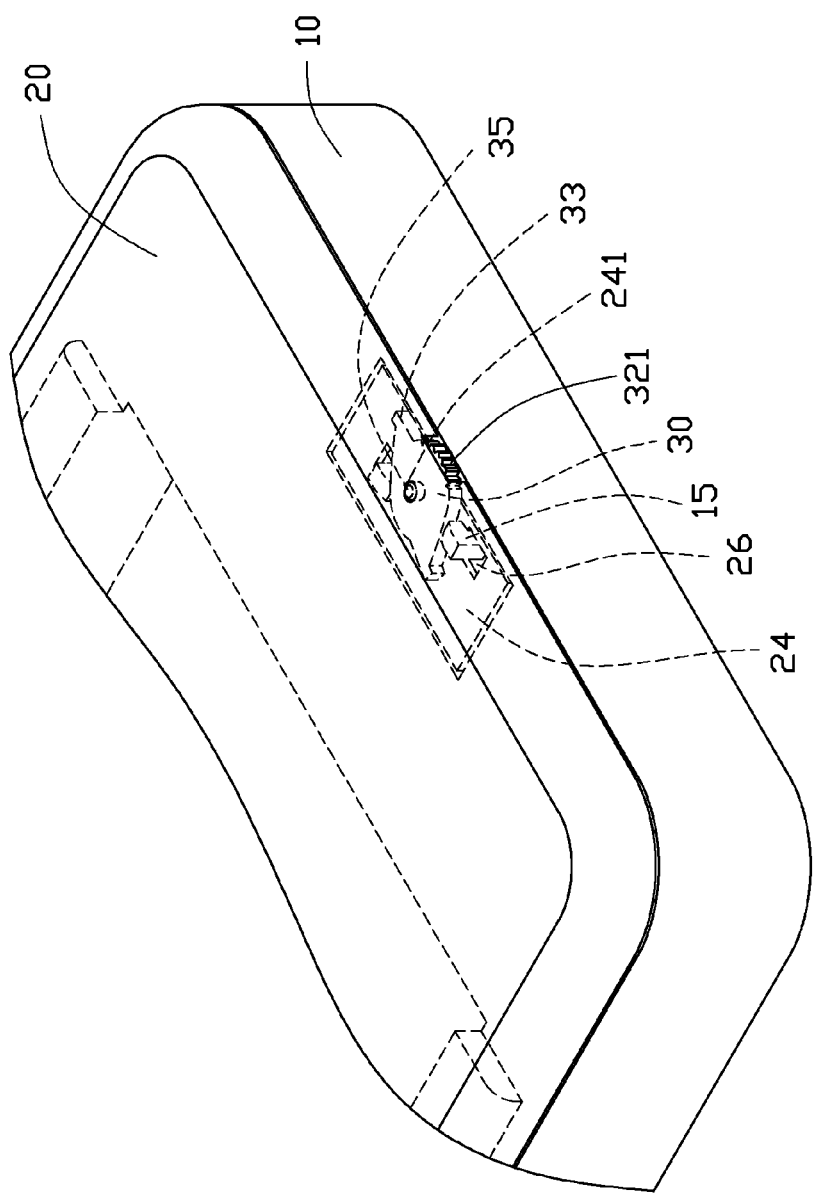
FIG. 3 is an assembled and perspective view of the portable electronic device shown in FIG. 1.
Figure 4:
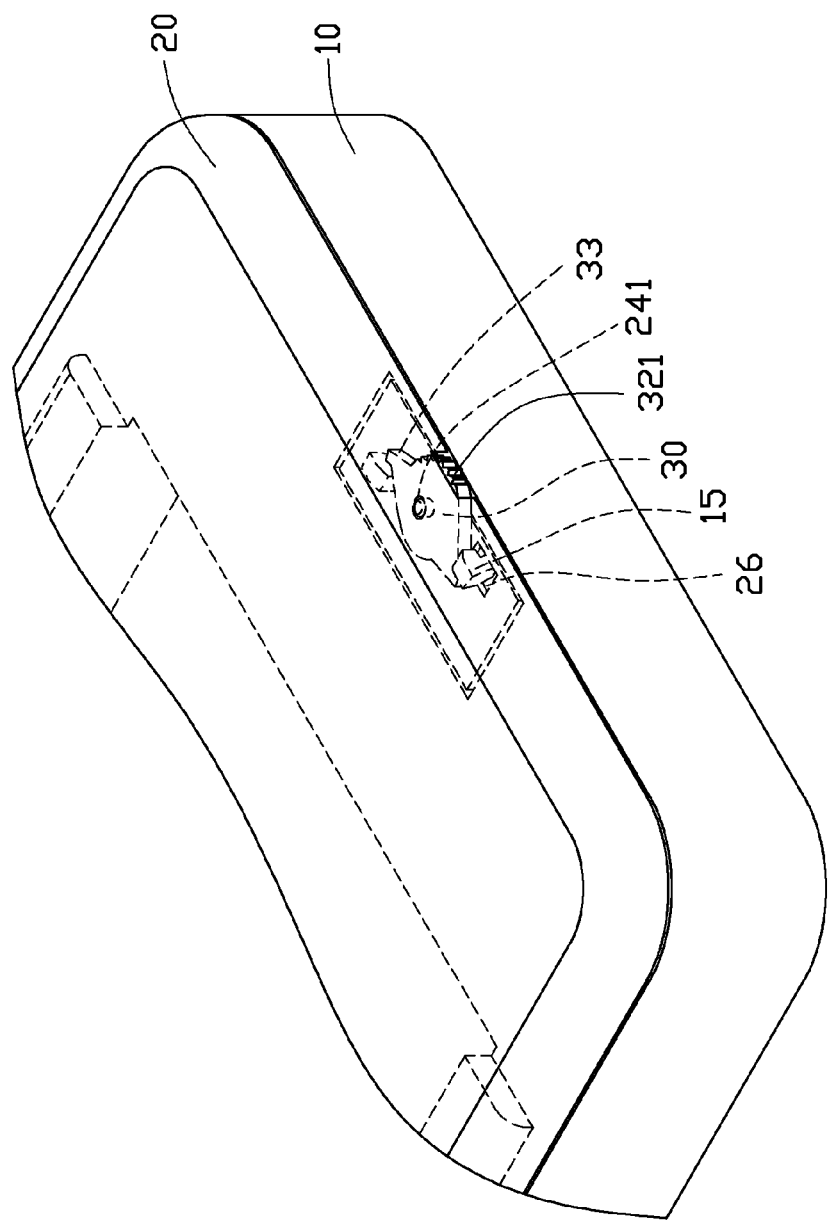
FIG. 4 is similar to FIG. 3, but a cover is released from a housing.
Figure 5:
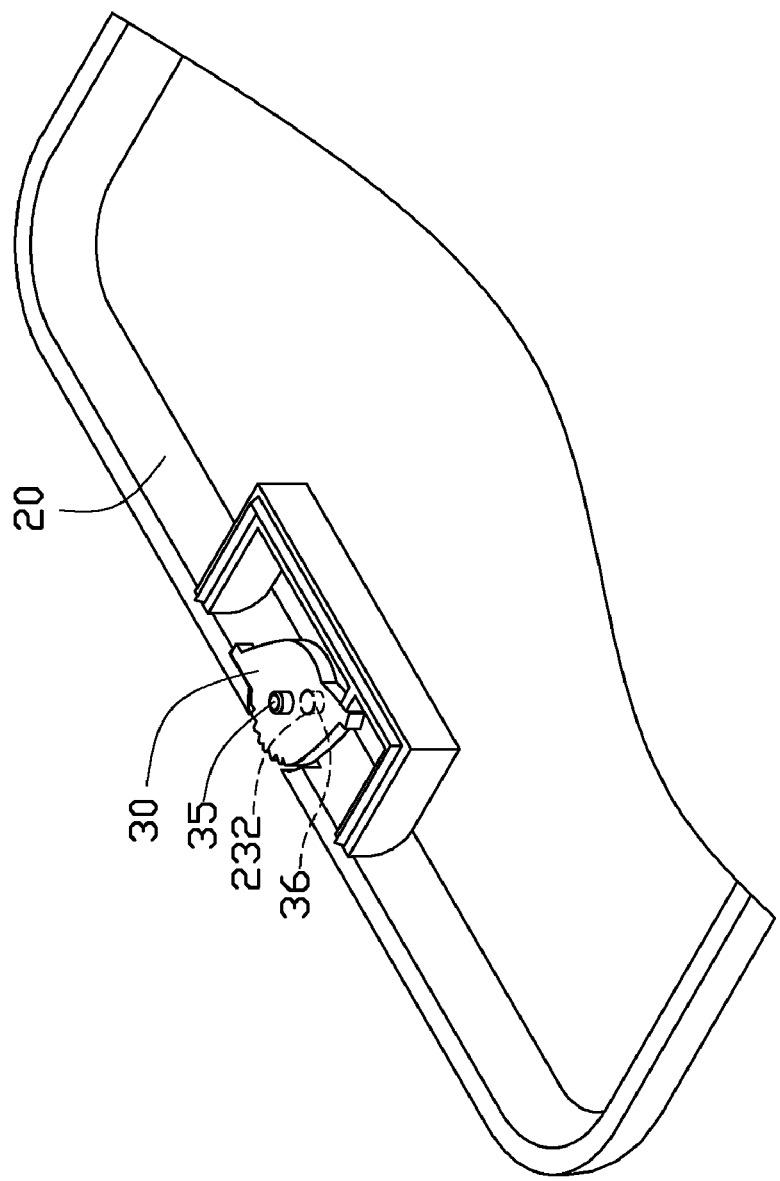
FIG. 5 is a schematic and perspective view of a latch mounted to a cover shown in FIG. 2.

Referring to FIGS. 3-4, to release the cover 20 from the housing 10, the latch 30 is rotated by actuating the raised portions 321. As the latch 30 rotates, each cam surface 32 pushes one of the hooks 15 away from the latching holes 26 to release the latching engagement between the hooks 15 and the latching board 24. Thus, the cover 20 can be released from the housing 10 like shown in FIG. 4.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism, comprising:
   a housing having at least one hook protruding therefrom;
   a cover having at least one latching hole defined therethrough and releasably latching with the hook, the cover defining a slot, a resisting groove, and protruding a protrusion; and
   a latch comprising a shaft rotatably mounted in the slot, two opposite cam surfaces formed on a side surface of the latch, and two opposite blocks protruding from the side surface of the latch;
   wherein when the housing is latched to the cover, one of the blocks is received in the resisting groove, the other of blocks resists the protrusion, and each cam surface resists one of the hooks; when the latch is rotated relative to the cover, each cam surface resists one of the hooks until the block pushes the hook away from the latching hole to release the latching engagement of the hook and the latching hole.

2. The battery cover latching structure as claimed in claim 1, wherein the cover includes a joint, the slot is defined in the joint.

3. The battery cover latching structure as claimed in claim 2, wherein the cover includes a main body and a sidewall connecting to the main body, the joint protrudes from the main body.

4. The battery cover latching structure as claimed in claim 3, wherein the cover further includes a mounting frame protruding from the main body and a latching board retained on the mounting frame, the joint is located in the mounting frame, the latching hole is defined through the latching board.

5. The battery cover latching structure as claimed in claim 4, wherein the latch is located between the main body and the latching board; the battery cover latching mechanism further includes a post protruding from the latch opposite to the shaft and an orifice defined in the latching board; the post is rotatably accommodated in the orifice.

6. The battery cover latching structure as claimed in claim 4, wherein the resisting groove is defined at the sidewall and the protrusion is protruded from the mounting frame.

7. The battery cover latching structure as claimed in claim 3, wherein the cover further includes an opening defined through the sidewall for exposing the latch out of the cover.

8. The battery cover latching structure as claimed in claim 7, wherein the latch further includes a plurality of raised portions protruding therefrom, the raised portions extend out of the opening for facilitating actuating the latch.

9. A battery cover latching mechanism, comprising:
   a housing having at least one hook protruding therefrom;
   a cover comprising a mounting frame and a latching board retained on the mounting frame; the mounting frame defining a slot, the latching board defining at least one latching hole therethrough, the at least one latching hole releasably latching with the hook; and
   a latch comprising a shaft rotatably mounted in the slot, two opposite cam surfaces formed on a side surface of the latch, and two opposite blocks protruding from the side surface of the latch;
   wherein when the housing is latched to the cover, one of the blocks is received in the resisting groove, the other of blocks resists the protrusion, and each cam surface resists one of the hooks; when the latch is rotated relative to the cover, each cam surface resists one of the hooks until the block pushes the hook away from the latching hole to release the latching engagement of the hook and the latching hole.

10. The battery cover latching structure as claimed in claim 9, wherein the cover includes a joint positioned in the mounting frame, the slot is defined in the joint.

11. The battery cover latching structure as claimed in claim 9, wherein the cover comprises a main body and a sidewall connecting to the main body, the mounting frame protrudes from the main body.

12. The battery cover latching structure as claimed in claim 9, wherein the latch is located between the main body and the latching board; the battery cover latching mechanism further includes a post protruding from the latch opposite to the shaft and an orifice defined in the latching board; the post is rotatably accommodated in the orifice.

13. The battery cover latching structure as claimed in claim 11, wherein the cover further includes an opening defined through the sidewall for exposing the latch out of the cover.

14. The battery cover latching structure as claimed in claim 13, wherein the latch further includes a plurality of raised portions protruding therefrom, the raised portions extend out of the opening for facilitating actuating the latch.

* * * * *